(12) United States Patent
Hirvi et al.

(10) Patent No.: US 10,701,670 B2
(45) Date of Patent: Jun. 30, 2020

(54) SYSTEM FOR CO-OPERATIVE REPETITION OF BROADCAST MESSAGES

(71) Applicant: WIREPAS OY, Tampere (FI)

(72) Inventors: Hannu Hirvi, Tampere (FI); Ville Kaseva, Tampere (FI); Jari Ruohonen, Tampere (FI)

(73) Assignee: WIREPAS OY, Tampere (FI)

( * ) Notice: Subject to any disclaimer, the term of this patent is extended or adjusted under 35 U.S.C. 154(b) by 0 days.

(21) Appl. No.: 15/861,012

(22) Filed: Jan. 3, 2018

(65) Prior Publication Data

US 2019/0208512 A1 Jul. 4, 2019

(51) Int. Cl.
| | |
|---|---|
| *H04W 72/04* | (2009.01) |
| *H04H 20/71* | (2008.01) |
| *H04W 74/08* | (2009.01) |
| *H04W 4/06* | (2009.01) |
| *H04L 12/18* | (2006.01) |
| *H04L 12/761* | (2013.01) |
| *H04W 84/18* | (2009.01) |
| *H04W 28/02* | (2009.01) |

(52) U.S. Cl.
CPC ........ *H04W 72/0406* (2013.01); *H04H 20/71* (2013.01); *H04L 12/1868* (2013.01); *H04L 45/16* (2013.01); *H04W 4/06* (2013.01); *H04W 74/0816* (2013.01); *H04W 28/0289* (2013.01); *H04W 84/18* (2013.01)

(58) Field of Classification Search
CPC ......... H04W 72/0406; H04W 28/0289; H04W 4/06; H04W 84/18; H04W 74/0816; H04H 20/71; H04L 12/1868; H04L 45/16
USPC ........................................ 370/445
See application file for complete search history.

(56) References Cited

U.S. PATENT DOCUMENTS

| | | | |
|---|---|---|---|
| 8,194,541 B2 | 6/2012 | Leppanen et al. | |
| 9,271,231 B2* | 2/2016 | Nucci | H04W 24/10 |
| 9,743,449 B2* | 8/2017 | Linsky | H04W 88/06 |
| 2006/0171332 A1* | 8/2006 | Barnum | H04W 8/005 |
| | | | 370/254 |
| 2008/0279204 A1* | 11/2008 | Pratt, Jr. | G01D 21/00 |
| | | | 370/406 |
| 2010/0177675 A1* | 7/2010 | Ai | H04L 12/189 |
| | | | 370/312 |
| 2010/0279647 A1 | 11/2010 | Jacobs et al. | |

(Continued)

FOREIGN PATENT DOCUMENTS

| | | |
|---|---|---|
| WO | 2010/137006 | 12/2010 |
| WO | 2012/072866 | 6/2012 |
| WO | 2012/072869 | 6/2012 |

OTHER PUBLICATIONS

European Search Report for Application No. 18 21 5216 dated Apr. 25, 2019.

*Primary Examiner* — Phong La
(74) *Attorney, Agent, or Firm* — Young & Thompson

(57) ABSTRACT

Disclosed is a system for co-operative repetition of broadcast messages comprising a plurality of router nodes, each being able to receive and repeat transmission of broadcast messages. The plurality of router nodes is configured to repeat collectively a transmission of a broadcast message on one or more frequency channels a collective target amount of times inside a neighborhood of the plurality of router nodes. The amount of repetitions of individual router nodes differs from 0 to n, wherein n>0, in order to achieve the collective target amount of repetitions.

49 Claims, 15 Drawing Sheets

(56) References Cited

U.S. PATENT DOCUMENTS

| | | |
|---|---|---|
| 2014/0153552 A1* | 6/2014 | Nucci .................. H04W 24/10 |
| | | 370/336 |
| 2014/0269704 A1 | 9/2014 | Alexander et al. |
| 2015/0207677 A1* | 7/2015 | Choudhury ......... H04L 41/0806 |
| | | 370/254 |
| 2016/0037486 A1* | 2/2016 | Wentzloff ......... H04W 52/0229 |
| | | 370/329 |
| 2017/0034852 A1* | 2/2017 | Norair .................. H04L 1/0061 |
| 2017/0126411 A1* | 5/2017 | Piqueras Jover ..... H04L 9/3247 |
| 2017/0264956 A1* | 9/2017 | Gerhards ........... H04N 21/4583 |
| 2017/0366956 A1* | 12/2017 | Yoshida ................ H04L 5/006 |
| 2018/0310339 A1* | 10/2018 | Li .................... H04W 74/0808 |

\* cited by examiner

300

300

SYSTEM FOR CO-OPERATIVE REPETITION OF BROADCAST MESSAGES

TECHNICAL FIELD

The invention concerns in general the technical field of wireless mesh networks. Especially the invention concerns enhancing fast delivery of data in wireless mesh networks.

BACKGROUND

A wireless mesh network (WMN) is formed by multiple, possibly even hundreds or thousands or even more of radio nodes 101 that may communicate with each other, depending on e.g. transmission range, frequency channel usage, etc. The wireless mesh network 100 may have one or more sink nodes 102 that may be part of gateways to other networks 103, e.g. Internet. A simple example wireless mesh network 100 is illustrated in FIG. 1. Wireless mesh network may not be in static radio environment and part of the nodes may move, appear or disappear. Therefore, the example mesh network illustrated in FIG. 1 is self-organizing, and every node may do decisions independently, but supporting the network and its data delivery functionality.

One example of the wireless mesh network may be a wireless sensor network (WSN) formed by sensor devices that produce data. Each sensor device may be equipped with one or more radios that are used to deliver the data towards the sink node. Even if a single sensor radio cannot directly reach the sink node, the wireless mesh network formed between the sensor radio nodes takes care of it. A routing protocol implemented in each radio node chooses the way to the sink. Similarly, there may be data that is delivered, over multiple radio hops, from the sink to the node(s) or in between nodes.

The data transmitted in a WMN may have tight timing requirements, i.e. low latency communication requirements from node to node or node to sink delivery. As an example, in lighting system the switching control data should be delivered over the wireless mesh network quickly, e.g. within few hundreds of milli-seconds to create better user experience.

The data delivery should be fast, but on the other hand should not cause jamming to the network. Broadcasting/flooding may be the fastest way to deliver data to multiple receivers, but it also may cause collisions and increase interference. In case of larger networks, a non-controlled burst of broadcast messages may fully block the channels and impact the delivery of other data.

In broadcast communication, the tradeoff between reliability and communication overhead can be controlled with different amount of repetitions of the broadcast messages. In typical broadcast/flooding communication protocols, the amount of repetitions is node-specific and is typically the same for every node. This means, that in dense installations, the total amount of repetitions can be excessive and cause a large overhead resulting in e.g. large amount of collisions and interference. On the other hand, in sparse installation, the amount of repetitions may be too low to achieve sufficient reliability. Both of the outcomes may result in reduced quality of service, e.g. lost data and/or increased delays.

The target of this invention is to provide a method for maximizing reliability whilst minimizing overhead in broadcast communications.

SUMMARY

An objective of the invention is to present a system, methods and a router node for co-operative repetition of broadcast messages. Another objective of the invention is that the system, the methods and router node for co-operative repetition of broadcast messages decrease the amount of unnecessary traffic and collisions in a wireless mesh network.

The objectives of the invention are reached by a system, a router node, methods, a computer program, and a computer-readable medium as defined by the respective independent claims.

According to one embodiment, a system for co-operative repetition of broadcast messages is provided, the system comprising a plurality of router nodes, each being able to receive and repeat transmission of broadcast messages, wherein the plurality of router nodes is configured to repeat collectively a transmission of a broadcast message on one or more frequency channels a collective target amount of times inside a neighborhood of the plurality of router nodes, wherein the amount of repetitions of individual router nodes differs from 0 to n, wherein n>0, in order to achieve the collective target amount of repetitions.

According to one embodiment, a method for co-operative repetition of broadcast messages is provided, wherein the method comprising: repeating, by a plurality of router nodes, collectively a transmission of a broadcast message a collective target amount of times inside a neighborhood of the plurality of router nodes on one or more frequency channels, wherein the amount of repetitions of individual router nodes differs from 0 to n, wherein n>0, in order to achieve the collective target amount of repetitions.

According to one embodiment, a router node for co-operative repetition of broadcast messages is provided, wherein the router node comprising: a micro-controller unit, and a memory storing at least one portion of computer program, wherein the microcontroller unit being configured to cause the router node at least to perform: receive and repeat transmission of broadcast messages, and collectively as a part of a plurality of router nodes repeat a transmission of a broadcast message on one or more frequency channels a collective target amount of times inside a neighborhood of the plurality of router nodes, wherein the amount of repetitions of the router node differs from 0 to n, wherein n>0, in order to achieve the collective target amount of repetitions.

According to one embodiment, a method for co-operative repetition of broadcast messages for a router node is provided, wherein the method comprising: receiving and repeating transmission of broadcast messages, and collectively as a part of a plurality of router nodes repeating a transmission of a broadcast message on one or more frequency channels a collective target amount of times inside a neighborhood of the plurality of router nodes, wherein the amount of repetitions of the router node differs from 0 to n, wherein n>0, in order to achieve the collective target amount of repetitions.

According to one embodiment, a computer program for co-operative repetition of broadcast messages by means of a router node, when run in a computer, is provided. The program comprises computer executable code for receiving and repeating transmission of broadcast messages, and collectively as a part of a plurality of router nodes repeating a transmission of a broadcast message on one or more frequency channels a collective target amount of times inside a neighborhood of the plurality of router nodes, wherein the amount of repetitions of the router node differs from 0 to n, wherein n>0, in order to achieve the collective target amount of repetitions.

According to one embodiment, a tangible non-volatile computer readable medium comprising a computer program for co-operative repetition of broadcast messages by means of a router node, when run in a computer, is provided. The program comprises computer executable code for receiving and repeating transmission of broadcast messages, and collectively as a part of a plurality of router nodes repeating a transmission of a broadcast message on one or more frequency channels a collective target amount of times inside a neighborhood of the plurality of router nodes, wherein the amount of repetitions of the router node differs from 0 to n, wherein n>0, in order to achieve the collective target amount of repetitions.

Further embodiments are disclosed the in dependent claims.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objectives and advantages thereof, will be best understood from the following description of specific embodiments when read in connection with the accompanying drawings.

BRIEF DESCRIPTION OF FIGURES

The embodiments of the invention are illustrated by way of example, and not by way of limitation, in the figures of the accompanying drawings.

DESCRIPTION OF SOME EMBODIMENTS

One method for achieving multi-hop communication in a wireless mesh network (WMN) is broadcasting and repeating (re-broadcasting) data inside the network, sometimes also called flooding. Nodes may be disallowed to repeat the broadcasted data multiple times, i.e. the repeating node is not allowed to repeat the transmission of the same data again, if it appears again later. For example, the data may include a unique identifier (ID) to identify the data and if a node receives data having ID that the node has already repeated, the node is not allowed to repeat said data again. For example, the ID may comprise of the original sender address and a sequence number. In addition, the data may include a hop limit to limit the scope of the broadcasted data. For example, the sender may set the hop limit for the data, and each node repeating the data may decrement the hop limit value. When a node receives data with hop limit value of zero, it will not repeat the data.

Figure 1:
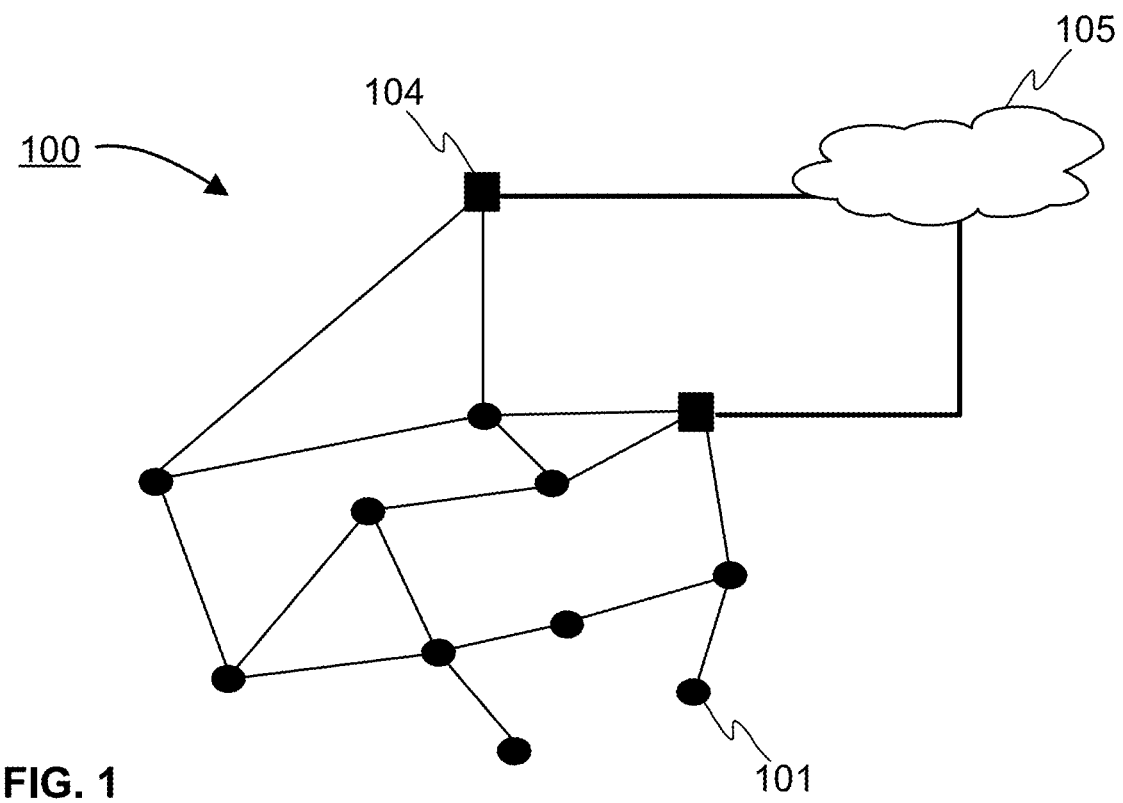
FIG. 1 illustrates schematically a simple example of a wireless mesh network.
Figure 2A:
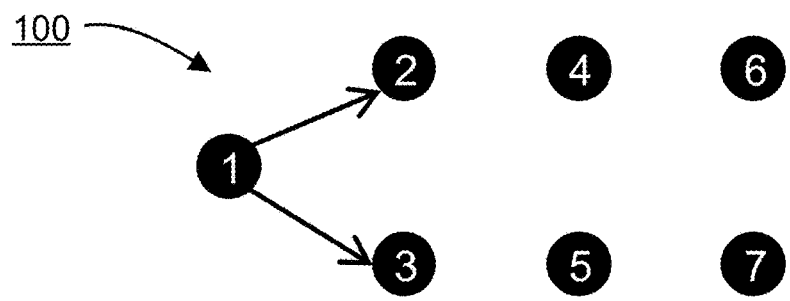
FIG. 2A-2D illustrate schematically an example of broadcasting and repeating data inside a multi-hop WMN.
Figure 2B:
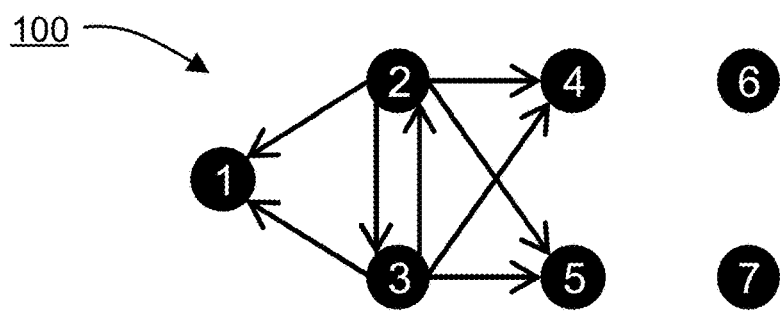
Figure 2C:
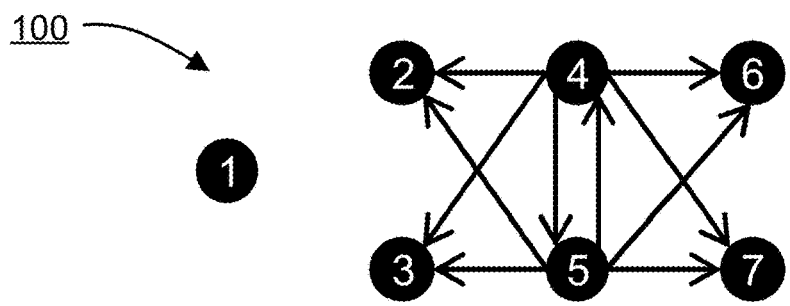
Figure 2D:
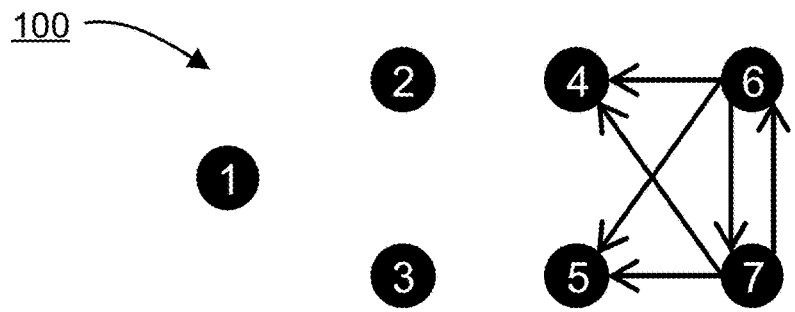

FIGS. 2A-2D illustrate an example of broadcasting and repeating data inside a multi-hop WMN 100. Node 1 broadcasts data that is received by nodes 2 and 3 (FIG. 2A). Nodes 2 and 3 repeat the data which is received by nodes 1, 2, 3, 4, and 5 (FIG. 2B). During the repeating, nodes 1, 2, and 3 receive duplicated data and will not repeat the duplicated data. Nodes 4 and 5 repeat the data which is received by nodes 2, 3, 4, 5, 6, and 7 (FIG. 2C). During the repeating, nodes 2, 3, 4, and 5 receive duplicated data and will not repeat the duplicated data. Nodes 6 and 7 repeat the data which is received by nodes 4, 5, 6, and 7 (FIG. 2D). During the repeating, nodes 4, 5, 6, and 7 receive duplicated data and will not repeat the duplicated data.

In the scope of this invention, the term broadcast refers to a communication method not destination addressing. By broadcasting and repeating the data is distributed to the nodes in the network. The nodes that the data is actually targeted to may be identified by separate addressing. The separate addressing may include for example broadcast addressing, where the data is destined to all the nodes in the network, or multicast addressing, where the data is destined to a group of nodes in the network, or unicast addressing where the data is destined to a single node in the network.

A system according to the invention comprises a plurality of nodes 301, hereinafter called router nodes, each being able to receive and repeat transmissions of broadcast messages. The plurality of router nodes 301 is configured to repeat collectively, i.e. co-operatively, a transmission of a broadcast message 603 a specified collective target amount of times inside a neighborhood of router nodes, i.e. inside a radio range 602. The target is to keep the local collective target amount of repetitions of the transmission of the broadcast message 603 the same inside the neighborhood 602 independent of the amount of router nodes 301 inside the neighborhood 602. The amount of repetitions of individual router nodes 301 may differ from 0 to n, wherein n>0, in order to achieve the common collective target amount of repetitions. The repetitions may be done on one or more frequency channels, which may be for example pre-configured or learned run-time by the router nodes 301. The collective target amount of repetitions and used frequency channels may or may not be the same in different neighbourhoods 602. The collective target amount of repetitions may be the same or different per frequency channel.

For example, if the number of the router nodes 301 within the radio range 602 of a receiving router node is high, the router node 301 may determine not to repeat the transmission of the broadcast message 603, because it is expected that the transmission of the broadcast message 603 is repeated by other router nodes 301 in the neighborhood 602. According to another example, if the quality of a frequency channels is poor, i.e. there is a lot of interference in the frequency channel, the router node 301 may determine to repeat the transmission of the broadcast message 603, because the blocking rate of the transmission at said frequency channel is high and thus multiple router nodes 301 are required to repeat the transmission of the broadcast message 603 on said frequency channel to achieve reliable communication.

The invention enables that a broadcast message 603 may be delivered by decreasing the amount of unnecessary traffic and collisions in the wireless mesh network. On another hand, the invention enables each router node 301 to do independent decision on whether to repeat or not the received broadcast message 603 based on information gathered from the neighborhood. The invention may be implemented in several WMN topologies.

Figure 3A:
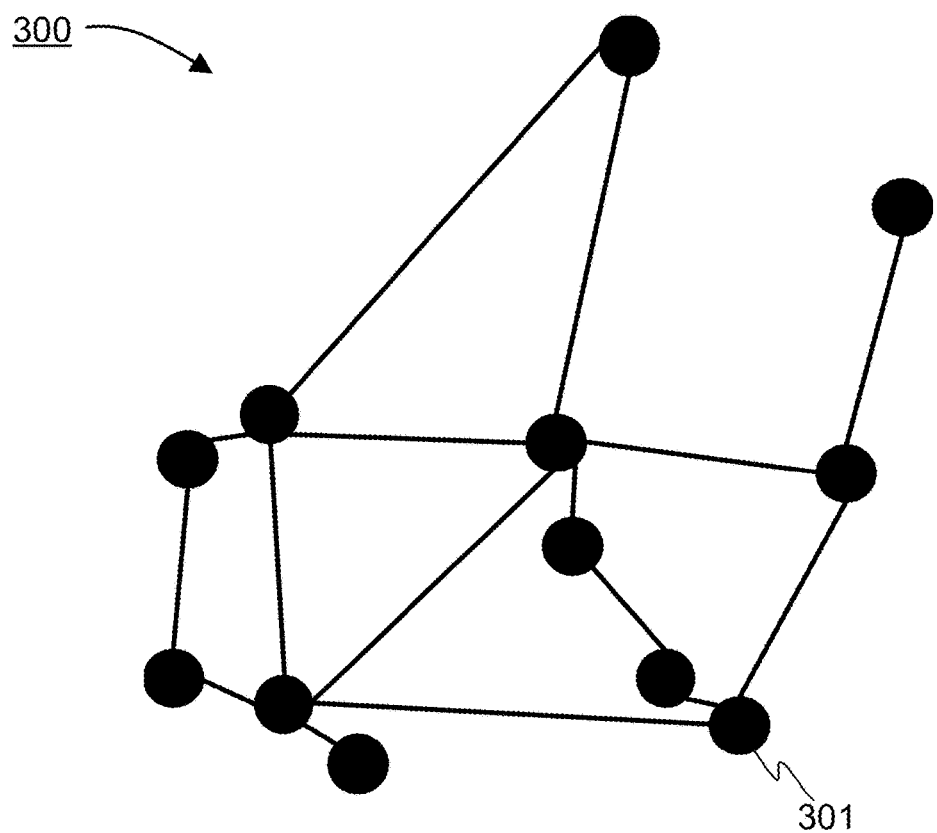
FIG. 3A illustrates schematically and example topology where all nodes are router nodes.
Figure 3B:
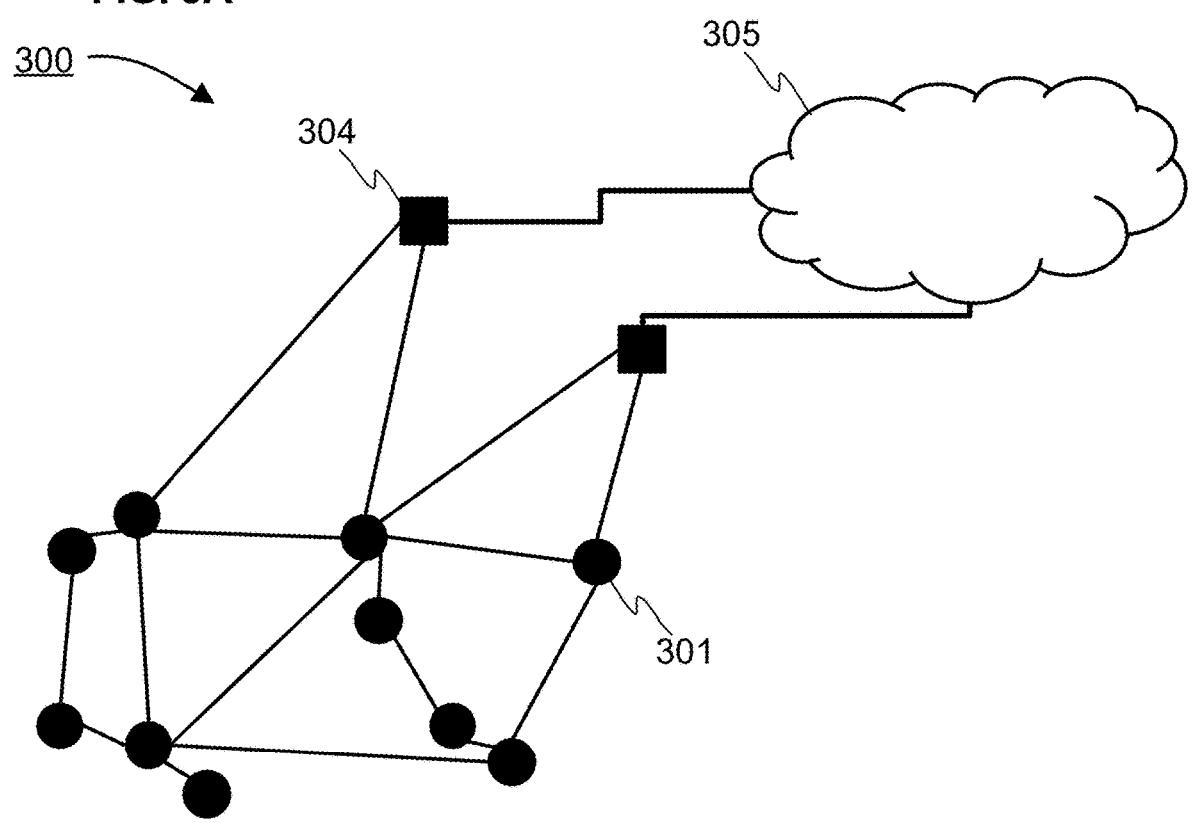
FIG. 3B illustrates schematically and example topology where all nodes are router nodes and additionally the network includes also sink nodes.

As an example, as illustrated in FIG. 3A, the invention may be implemented in a topology where all nodes are router nodes 301 and the communication may happen between router nodes 301 inside the network 300. Additionally, as illustrated in FIG. 3B, the network 300 may also include sink nodes 304 (shown as black squares) that may be part of gateways to other networks 305, e.g. Internet, and the communication may happen additionally between the sink nodes 304 and router nodes 301.

Figure 4A:
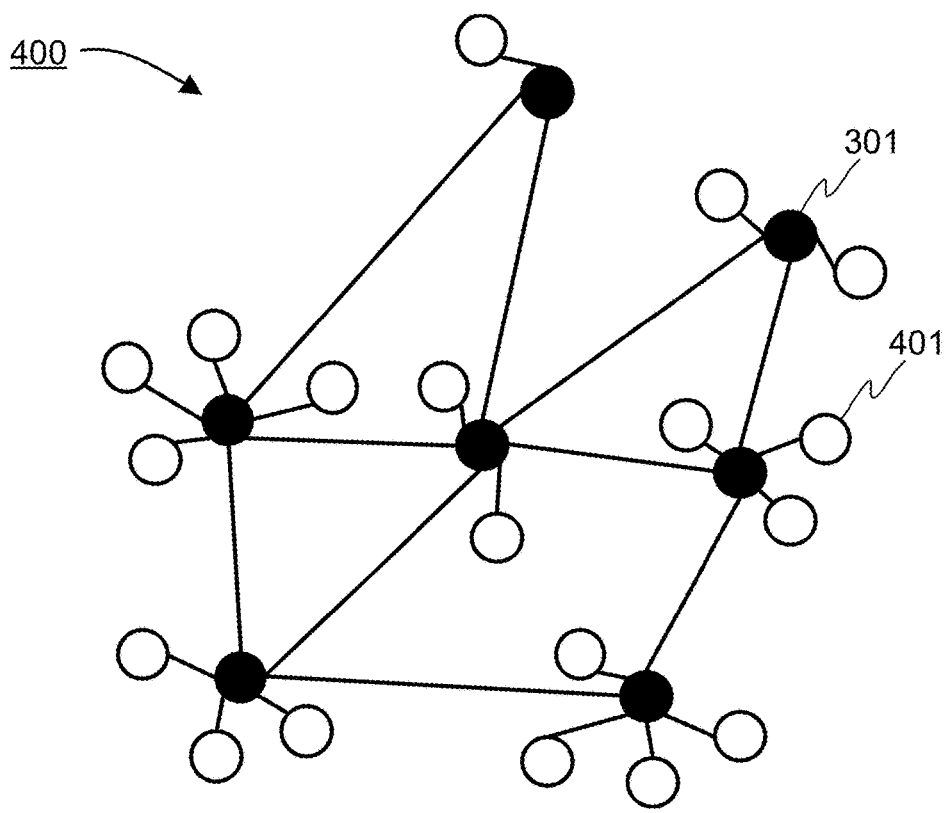
FIG. 4A illustrates schematically an example topology where part of the nodes are router nodes and part of the nodes cannot route and can be only end nodes in the network.
Figure 4B:
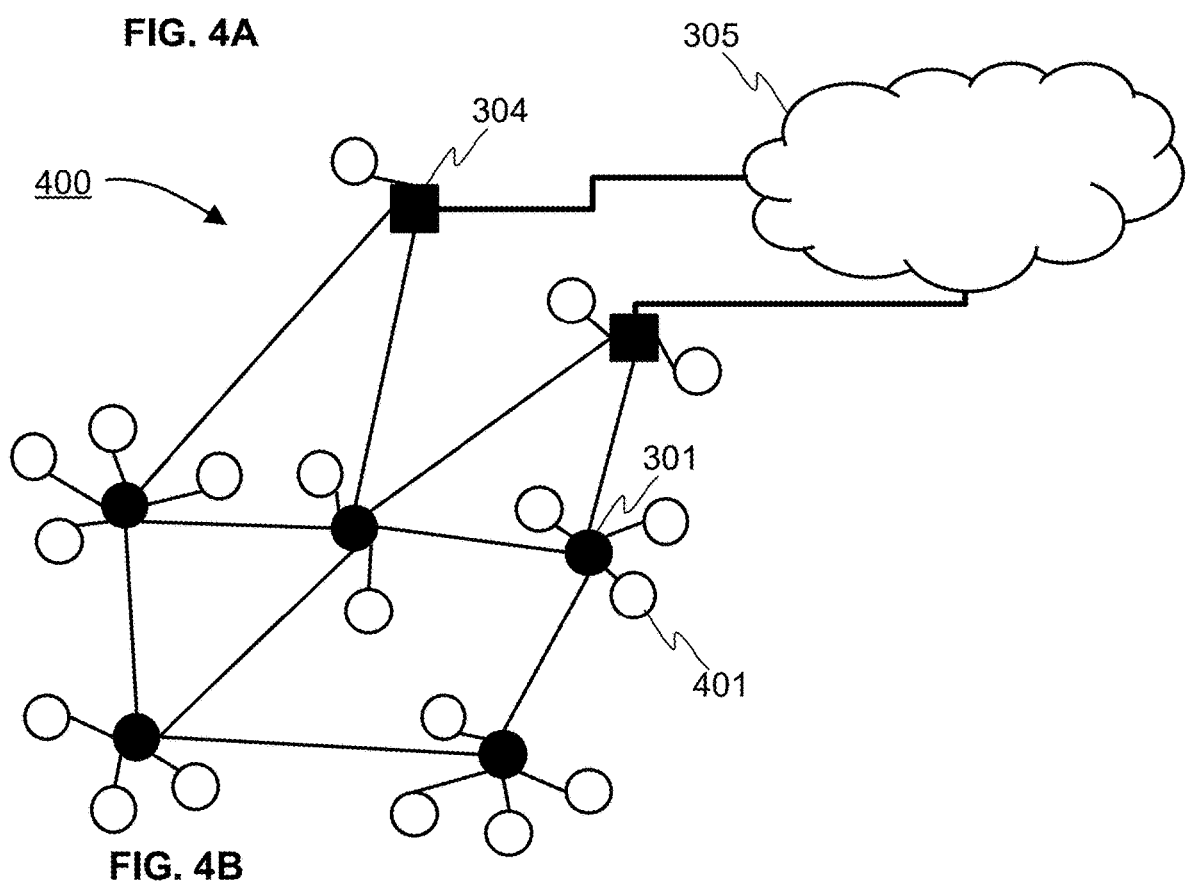
FIG. 4B illustrates schematically an example topology where part of the nodes are router nodes and part of the nodes cannot route and can be only end nodes in the network and additionally the network includes also sink nodes.

As another example, as illustrated in FIG. 4A, the invention may be implemented in a topology where part of the nodes are router nodes 301 (shown as black circles) and part of the nodes cannot route and can be only end nodes 401 (shown as white circles) in the network 400. The communication may happen between all the nodes 301, 401 inside the network 400, but the nodes 401 that cannot route will not repeat the data (i.e. they can only act as source or destination nodes for the data). Additionally, as illustrated in FIG. 4B, the network 400 may also include sink nodes 304 that may be part of gateways to other networks 305, e.g. Internet, and the communication may happen additionally between the sink nodes 304 and other nodes 301, 401 in the network.

Figure 5A:
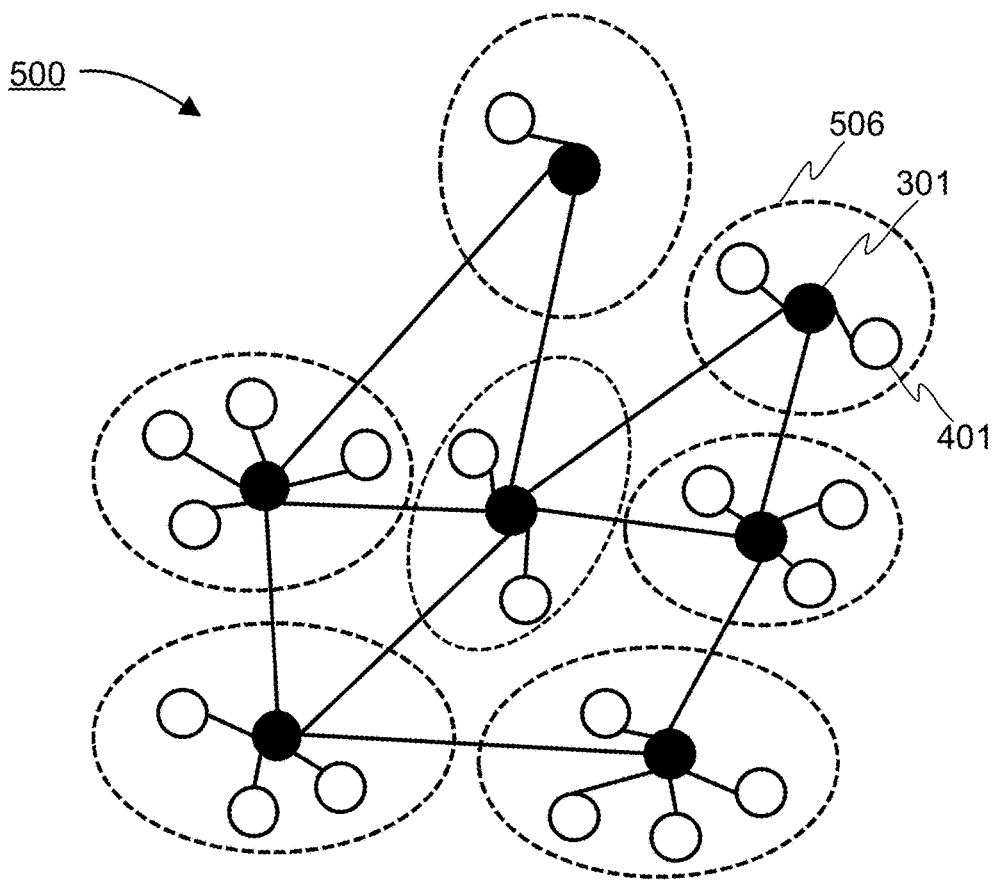
FIG. 5A illustrates schematically an example of a clustered topology.
Figure 5B:
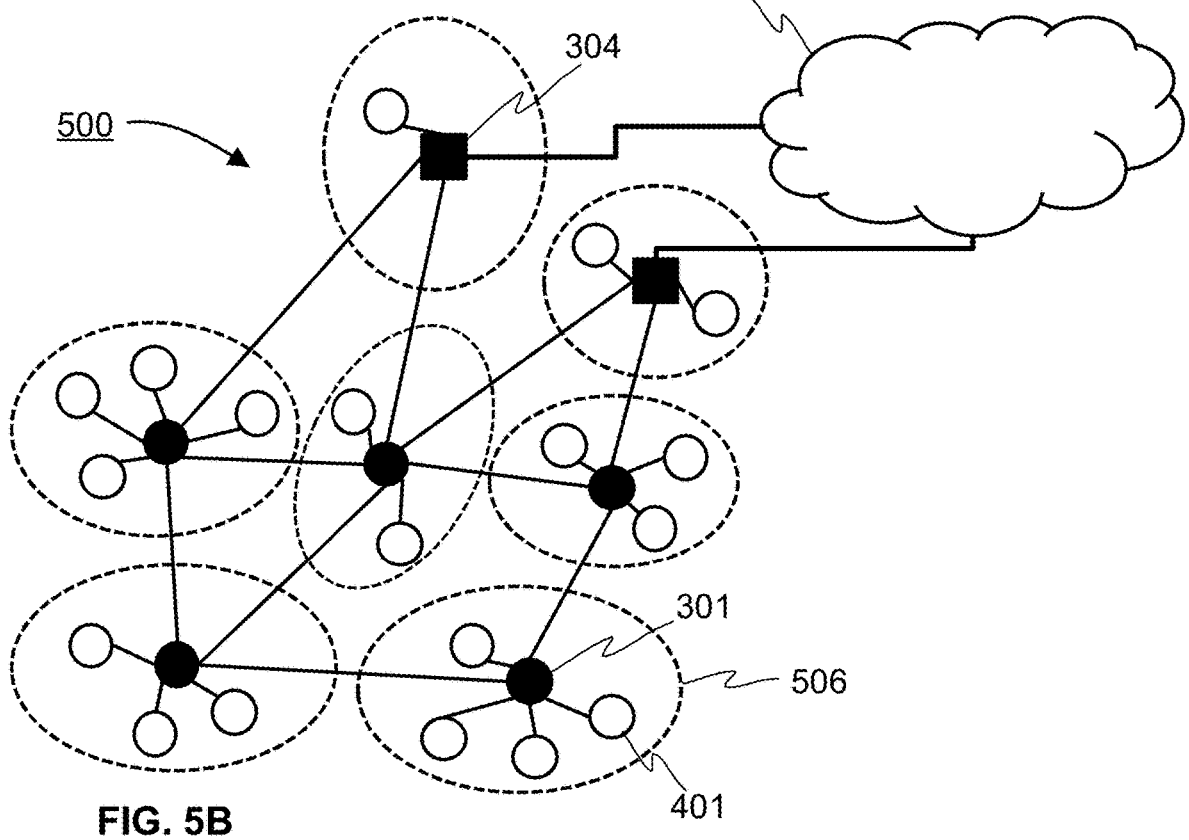
FIG. 5B illustrates schematically an example of a clustered topology and additionally the network includes also sink nodes.

As another example, as illustrated in FIG. 5A, the invention may be implemented in a clustered topology, where WMN 500 may comprise of one or more clusters 506 which may be dynamically or statically formed. The WMN 500 may include router nodes 301 that are capable of acting as cluster heads and cluster members and nodes 401 that cannot route data which can only act as cluster members. The communication may happen between all the nodes 301, 401 inside the network 500, but the nodes 401 that cannot route will not repeat the data (i.e. they can only act as source or destination nodes for the data). Additionally, as illustrated in FIG. 5B, the network 500 may also include sink nodes 304 that may be part of gateways to other networks 305, e.g. Internet, and the communication may happen additionally between the sink nodes 304 and other nodes 301, 401 in the network 500.

Figure 6:
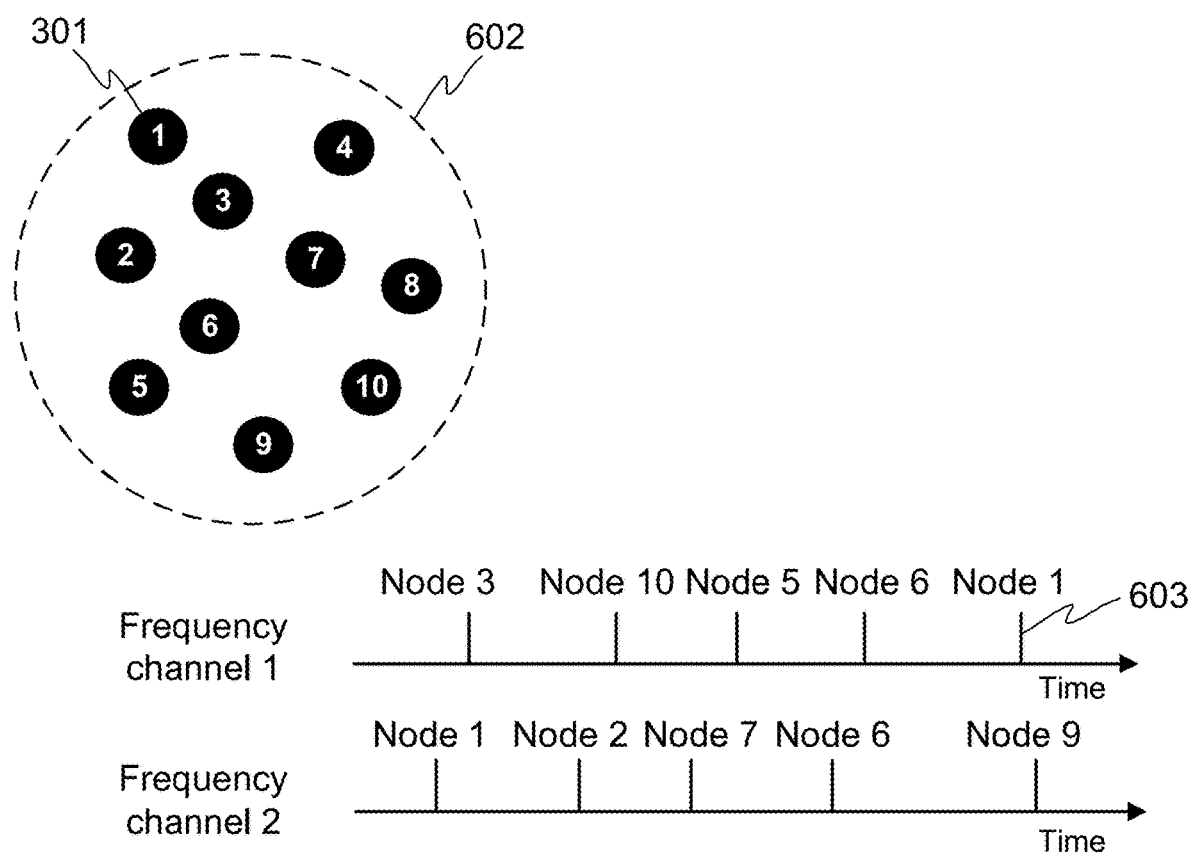
FIG. 6 illustrates schematically an example of specified amount of repetitions inside a neighborhood of node in a dense installation according to the invention.

FIG. 6 illustrates schematically an example of a dense installation of 10 router nodes 301 inside a neighborhood 602. In a real installation 10 router nodes may not be considered a dense installation, but in order to keep the FIG. 6 clear and simple 10 router nodes are used to represent a dense installation. In the example, the used amount frequency channels is 2 and the targeted amount of collective repetitions in the neighborhood 602 is 5 for both frequency channels. Upon receiving a broadcast message 603, each router node runs a repeat decision procedure that will be described later. As an example, result of the repeat decision procedure, nodes 3, 10, 5, 6, and 1 repeat the transmission of the message 603 in frequency channel 1 and nodes 1, 2, 7, 6, and 9 repeat the transmission of the message 603 in frequency channel 2. This results in targeted amount of collective repetitions of the broadcast message 603 in both frequency channels. The group of router nodes 301 repeating the broadcast message 603 in a specific frequency channel may or may not be the same.

Figure 7:
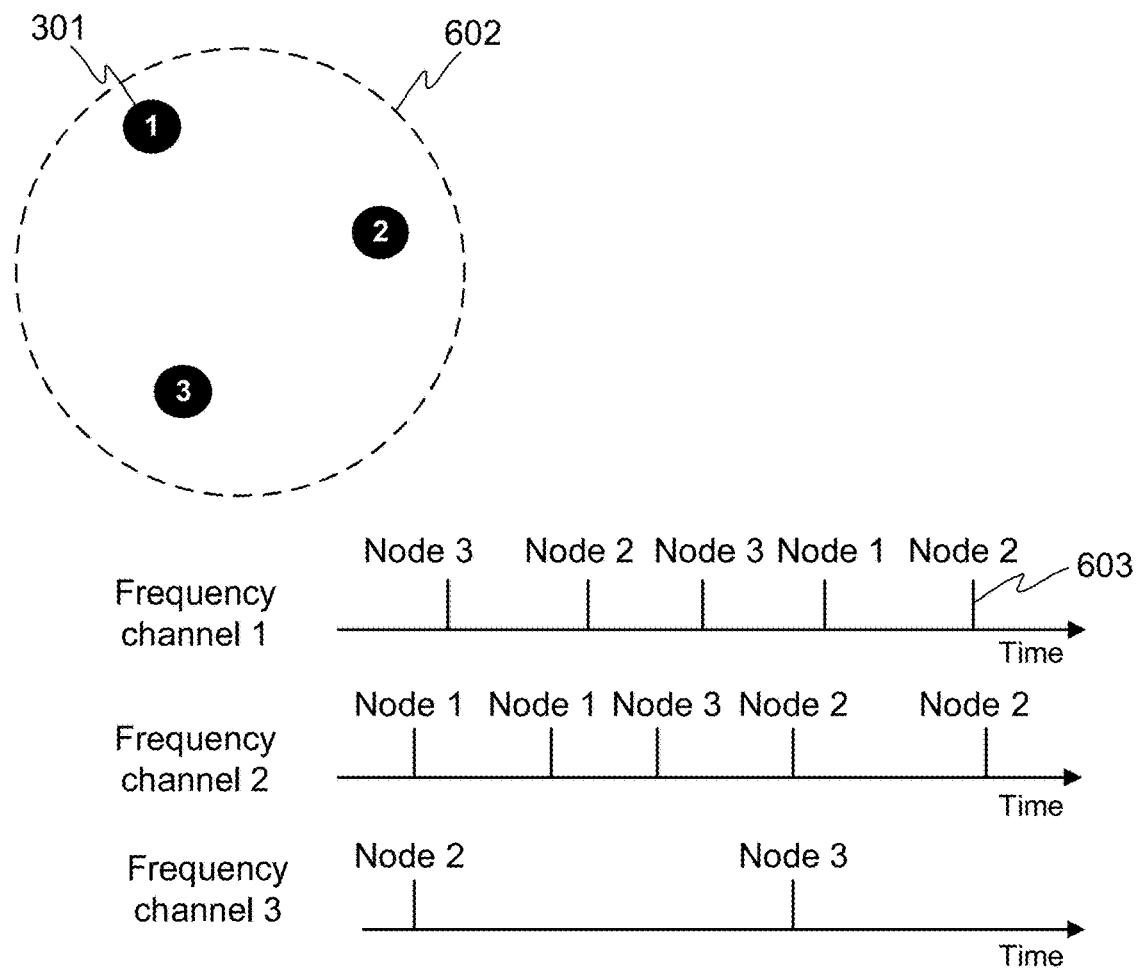
FIG. 7 illustrates schematically an example of specified amount of repetitions inside a neighborhood of nodes in a sparse installation according to the invention.

FIG. 7 illustrates schematically an example of a sparse installation of 3 router nodes 301 inside a neighborhood 602. In the example, the used amount frequency channels is 3 and the targeted amount of collective repetitions in the neighborhood 602 is 5 for frequency channels 1 and 2, and 2 for frequency channel 3. Upon receiving a broadcast message 603, each router node 301 runs a repeat decision procedure that will be described later. As an example, result of the repeat decision procedure, nodes 3 and 2 repeat the transmission of the message 603 twice and node 1 repeats the transmission of the message 603 once in frequency channel 1, nodes 1 and 2 repeat the transmission of the message 603 twice and node 3 repeats the transmission of the message 603 once in frequency channel 2, and nodes 2 and 3 repeat the transmission of the message 603 once in frequency channel 3. This results in targeted amount of collective repetitions of the broadcast message 603 in all the frequency channels. The group of nodes 301 repeating the broadcast message 603 in a specific frequency channel may or may not be the same.

Figure 8:
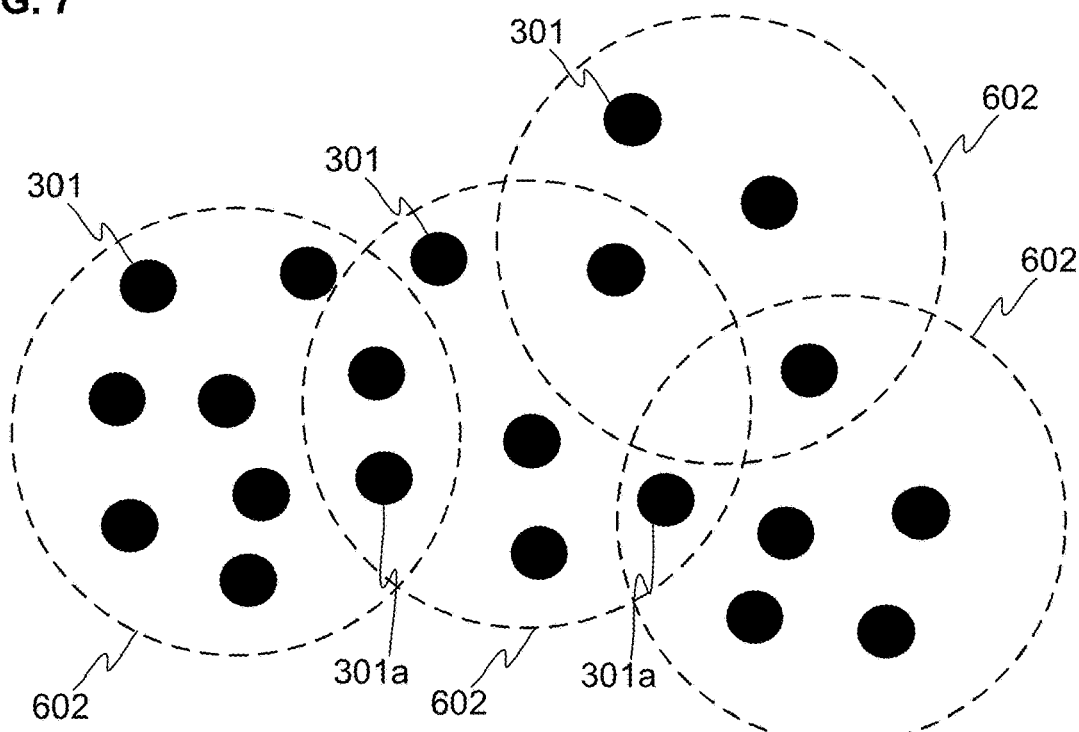
FIG. 8 illustrates schematically an example of multiple overlapping neighborhoods and multi-hop communication according to the invention.

FIG. 8 illustrates schematically an example of multiple overlapping neighborhoods 602 of nodes 301, 301a. In each neighborhood 602 and each frequency channel the amount of collective repetitions may have a common target value or an individual target value which is optimized for that neighborhood 602 and frequency channel. Repetitions of router nodes 301a belonging to multiple neighborhoods 602 will be heard inside multiple neighborhoods 602 enabling multi-hop communication.

The numbers of router nodes 301, frequency channels and repetitions used in the above examples are non-limiting examples and the system according to the invention may comprise any number of router nodes 301 and any number of frequency channels and repetitions may be employed.

Each of the router nodes 301 inside a neighborhood 602 do the repeat decisions independently based on information gathered from the neighborhood. Alternatively or in addition, the decision may be based on either information preprogramed to the router nodes 301 or sent dynamically (i.e. the information of neighbour of neighbourhood nodes or input for random procedure). This may be advantageous, when the topology is known beforehand and there is no big variations in the density of network, e.g. in the field of solar panel. With this kind of clear topologies and knowing the node locations a node specific optimal pre-configuration may be made and even end nodes 401 may be used to repeat messages. Upon receiving a broadcast message 603, a router node 301 will go through a flow, i.e. procedure or method, which may result in the decision to repeat the transmission of the message 603 in specific frequency channels and to not repeat the transmission of the message 603 in another set of frequency channels. In other words, each router node 301 that receives a broadcast message 603 is individually configured to decide for each frequency channel whether to repeat the transmission of the received message 603. In response to decision to repeat the transmission of the received message 603 on a frequency channel, the router node 301 is further configured to determine the amount of repetitions on said frequency channel and to repeat the transmission of the received message 603 determined amount of times on said frequency channel.

Figure 9A:
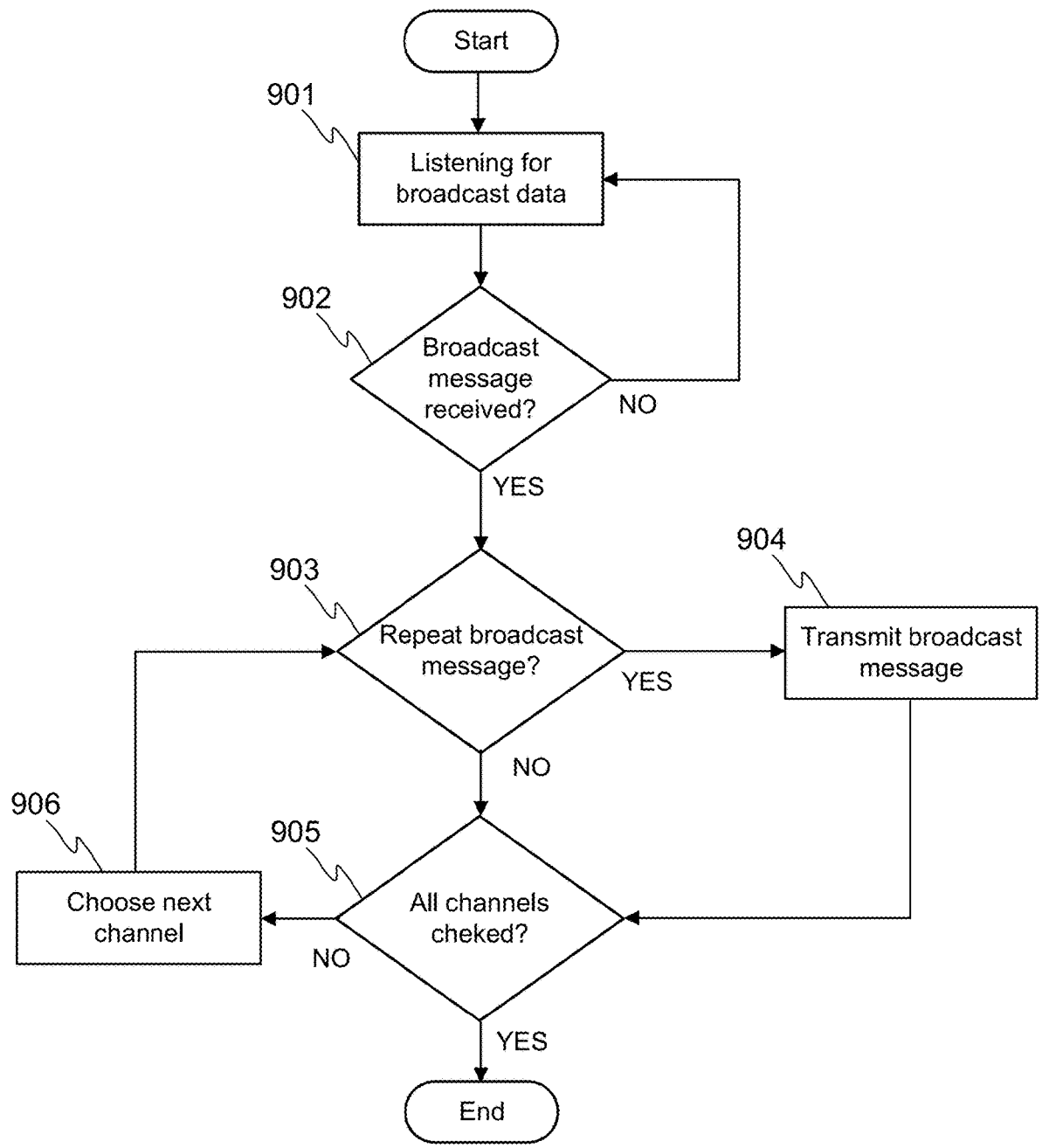
FIG. 9A illustrates schematically an example of a method according to the invention for a router node to co-operatively achieve the specified amount of repetitions inside a neighborhood.

FIG. 9A illustrates schematically an example flow, i.e. procedure or method, according to the invention for a router node 301 that results in the correct collective repetition amount inside a neighborhood 602 and per frequency channel. A router node 301 listens for broadcast data 901. When broadcast message 603 is received 902 the router node 301 goes through all the used frequency channels 905, 906. For each frequency channel, the node 301 checks 903 if the transmission of the received message 603 should be repeated by the router node 301 in question and the amount of repetitions the router node 301 should do on the frequency channel. If the node 301 should repeat the transmission of the message 603, it transmits 904 the message 603 in the current frequency channel the determined amount of times using a pre-defined or run-time selected channel access method, and continues to check the next channel 906. In other words, the router node 301 repeats the transmission of the received message 603 after the decision to repeat the transmission and determination of the amount of repetitions on a frequency channel.

Figure 9B:
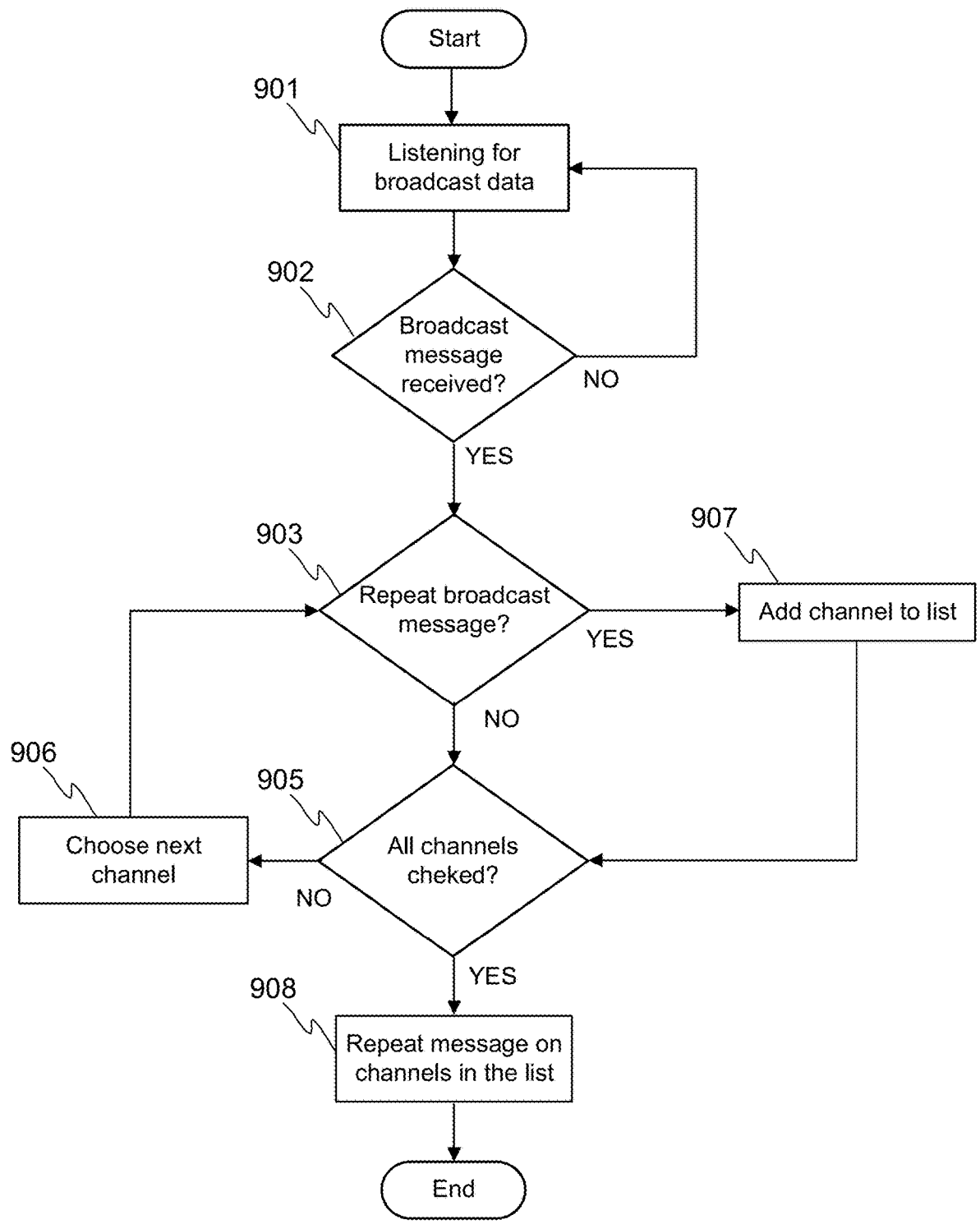
FIG. 9B illustrates schematically another example of a method according to the invention for a router node to co-operatively achieve the specified amount of repetitions inside a neighborhood.

FIG. 9B illustrates schematically another example flow, i.e. procedure or method, according to the invention for a router node 301 that results in the correct collective repetition amount inside a neighborhood 602 and per frequency channel. A router node 301 listens for broadcast data 901. When broadcast message 603 is received 902 the router node 301 goes through all the used frequency channels 905, 906. For each frequency channel, the node 301 checks 903 if the transmission of the received message 603 should be repeated by the router node 301 in question and the amount of repetitions the router node should do on the frequency channel. If the node should repeat the transmission of the message 603, it adds 907 the frequency channel and repetition amount to a list. After all frequency channels are checked, the router node 301 goes through the list of frequency channels and transmits the message 603 in the frequency channels the specified amount of times using a predefined or run-time selected frequency channel access method 908. In other words, the router node 301 adds a frequency channel and the determined repetition amount to a list after the decision to repeat the transmission and determination of the amount of repetitions on said channel and repeats the transmission of the received message 603 on all of the frequency channels added to the list after checking all the frequency channels.

According to an embodiment of the invention, in order to avoid collisions of the messages and to increase reception probability, multiple methods may be employed separately or together. For example, each router node may employ at least one of the following:

Random repeat delay method, wherein the target is to decrease the probability of message collisions and to increase the probability that other router nodes are listening when a specific router node 301 is transmitting and to get the nodes 301 to start the repetitions asynchronously over time after receiving a message 603 to repeat at the same time. There are several ways to accomplish this. For example, for any transmission a random delay may be employed. Especially, it may be beneficial to employ a random delay before starting the repetition process in order avoid nodes 301 starting the repetition process synchronously and to avoid collisions. For example, by adding a random start delay before the first transmission that is a multiple of the expected time for all repetitions of a single broadcast. As another example, random start delays may be used which variations are high enough for the nodes 301 to able to detect the possible collisions via the Carrier Sense Multiple Access with Collision Avoidance (CSMA-CA) method. The target is also to avoid transmitting on top of the previous repeater or the originator node where adding a constant delay on top of the random will decrease this probability. To be noted however that it is not relevant to get an optimal interleaving over time since as per invention methods we can also randomize the order of frequencies to repeat on and the frequencies to use in case the expected collision probability of the repetitions will be a combined result of these two or three random processes. Moreover, the longer variation in the start time increases the total latency of message delivery and thus the target range of spreading the transmissions over time typically depends on the application requirements like latency, reliability and data throughput.

Carrier Sense Multiple Access with Collision Avoidance (CSMA-CA) method, wherein before each transmission the frequency channel is sensed using a Clear Channel Assessment (CCA). If the frequency channel is free the message is transmitted. If the channel is busy, the transmission of the message is randomized/deferred to a later time, i.e. backoff time, after which the transmissions is attempted again. In other words, if the sensing indicates that the frequency channel is free, the router node 301 repeats the transmission of the broadcast message 603, and if the sensing indicates that the frequency channel is busy, the router node 301 defers the repetition of the transmission of the broadcast message 603 to a later time after which the router node 301 attempts to repeat the transmission of the broadcast message 603 again. Alternatively, if the frequency channel is busy or remains busy for n attempts, the transmission may also be skipped on that frequency channel.

Figure 10A:
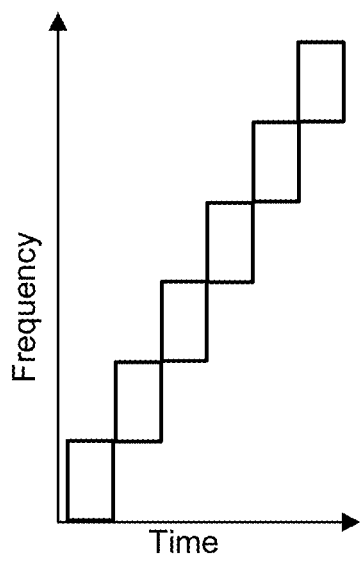
FIGS. 10A-10C illustrates schematically examples of frequency hopping sequences.
Figure 10B:
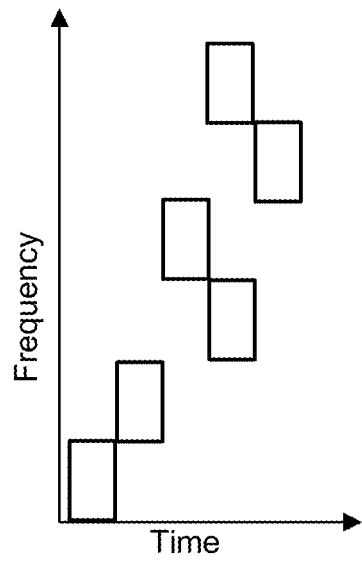
Figure 10C:
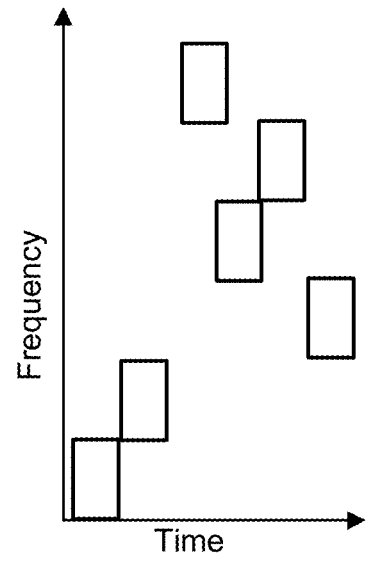

Randomized repeat channel selection method (when multiple frequency channels are used), wherein the order of frequency channels is randomized resulting in a frequency hopping schedule. Some examples of frequency hopping sequences are illustrated in FIGS. 10A-10C. When combined with the CSMA-CA method, the transmission on other frequency channels may be attempted during the backoff times on other channels.

In case the broadcast method is used to deliver a unicast message and the addressed node is a member or known neighbor of the router, the router may also skip the repetitions and instead send a point to point message to the addressed node. In this case it may be beneficial to require an acknowledgement to the message to ensure the delivery.

If there are pre-configured set of frequency channels and up-to-date information on the frequency channels, e.g. via synchronized or energy-efficient neighbor discovery protocol as will be described later, actually used in the neighborhood 602, the used frequency channels may be prioritized over the non-used ones. To minimize overhead even more, transmission on the unused frequency channels may be omitted altogether.

According to an embodiment of the invention the decision to repeat the transmission of the broadcast message 603 or not (step 903 in FIGS. 9A and 9B) may be based on a frequency channel-specific Transmit Decision Value (TDV). The TDV describes probability with which an individual router node 301 should transmit a broadcast message 603 on a frequency channel so that the collective target amount is achieved.

The frequency channel-specific TDV may be defined based on targeted amount of collective repetitions per radio range, $N_R$, and amount of router nodes inside the radio range, $N_D$. In addition, the frequency channel-specific TDV, may further be defined based on at least one of the following: success rate of transmissions at said frequency channel, SR, percentage of time the router nodes are in a receiving mode on average, AR.

According to an example, the TDV may be defined according to the following formula:

$$TDV = \frac{N_R}{N_D}$$

wherein $N_R$ is the targeted amount of collective repeats per radio range and $N_D$ is the amount of router nodes inside the radio range.

If $N_R$ increases the probability of a single router node repeating the transmission of the message increases and vice versa (higher $N_R$ means that more collective repetitions are needed). If $N_D$ increases the probability of single router node repeating the transmission of the message decreases and vice versa (higher $N_D$ means that less repetitions are needed per router node to achieve same collective target amount $N_R$).

For each frequency channel the decision to repeat the transmission of the message 603 or not may be provided as follows:
1. Calculate TDV for the channel
2. Generate a random value, R, from a uniform distribution between 0 and 1
3. If R<=TDV→Repeat/transmit on channel
4. TDV=TDV−1
5. If TDV>0 go to 2.

Example 1:
$N_R$=10, $N_D$=10→TDV=1
→All 10 nodes repeat once resulting in total of 10 transmissions (=$N_R$)

Example 2:
$N_R$=10, $N_D$=5→TDV=2
→All 5 nodes repeat twice resulting in total of 10 transmissions (=$N_R$)

Example 3:
$N_R$=5, $N_D$=10→TDV=0.5
→50% (0.5) of the 10 nodes repeat resulting in total of 5 transmissions (=$N_R$)

According to another example, a more complex TDV may be defined according to the following formula:

$$TDV = \frac{N_R}{N_D * SR * AR}$$

wherein $N_R$ is number of repetitions per radio range, $N_D$ of router nodes inside the radio range, SR success rate of transmissions at said channel, and AR is the percentage of time the router nodes are in a receiving mode on average.

If $N_R$ increases the probability of a single router node repeating the message increases and vice versa (higher $N_R$ means that more collective repetitions are needed). If $N_D$ increases the probability of single router node repeating the message decreases and vice versa (higher $N_D$ means that less repetitions are needed per router node to achieve same collective target amount $N_R$). If SR increases the probability of single router node repeating the transmission of the message decreases and vice versa (higher SR means that less repetitions are needed per router node to achieve same collective target amount $N_R$ as the success rate of a single repetition is higher). If AR increases the probability of single router node repeating the transmission of the message decreases and vice versa (higher AR means that less repetitions are needed per router node to achieve same collective target amount $N_R$ as the reception success rate of a single repetition is higher).

The parameters $N_R$, $N_D$, SR, and AR may be obtained several ways, for example according to the following examples:
- As an example, $N_R$ can be a pre-configured value, or it can be set by the application, or it can be learned during the run-time operation.
- As an example, $N_D$ can be overheard from data transmissions of other nodes, or it can be obtained with a passive or active network scan from router nodes' signaling beacons in a beacon-enabled network, or it can be obtained synchronously from neighbors' neighbors advertisements if a synchronous neighbor discovery method is supported, or a combination of the previous methods may be used.
- As an example, SR can be obtained from CCA operations done on a frequency channel.
- As an example, AR can be estimated from own operation of the router node or advertised by the neighbors in network signaling frames.
- As an example, to obtain ND, nodes may discover router node neighbors from data messages sent by said router node neighbors. The data messages may be sent and received in one or multiple frequency channels. For each data message a node receives from a router node neighbor, it may record to an internal list the sender of said message. The total router node amount in the neighborhood is the number of items in said list. In addition, also other parameters of the sender may be recorded.

Figure 11:
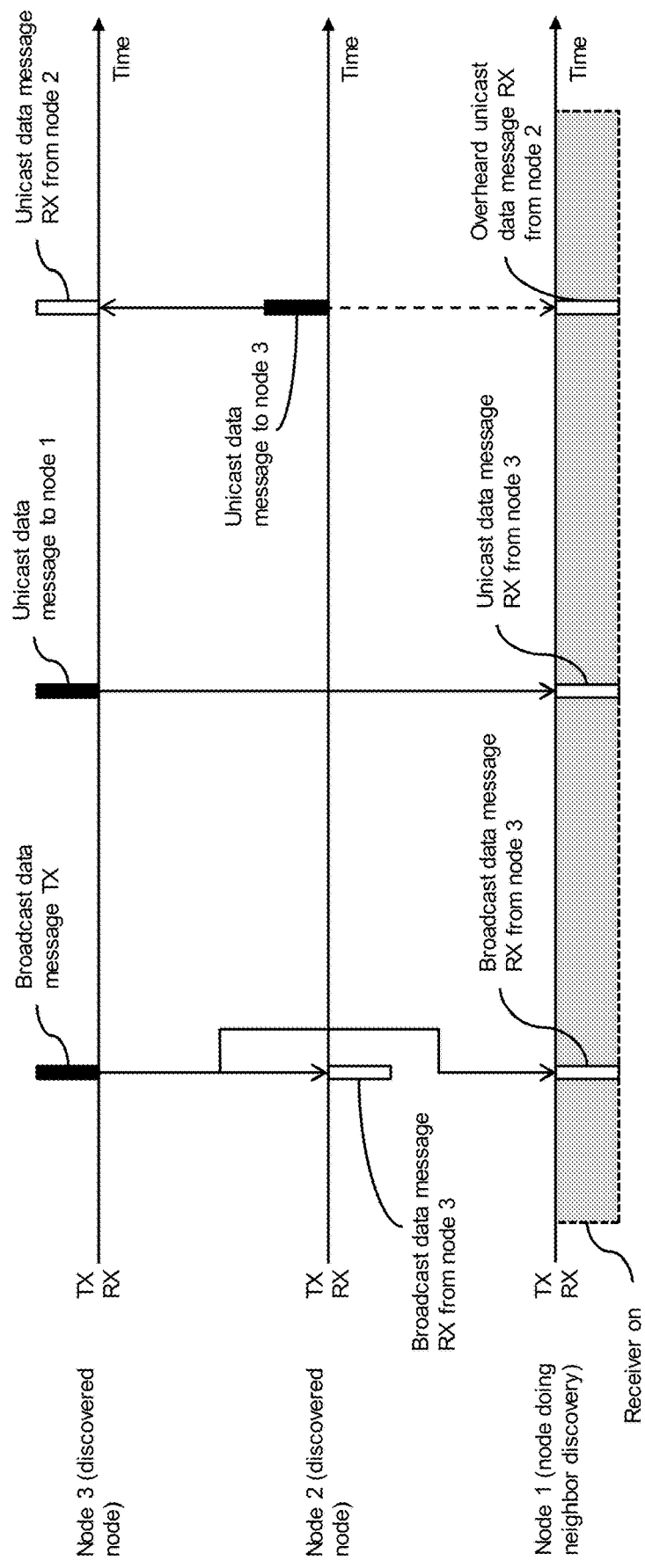
FIG. 11 illustrates schematically an example of neighbor discovery using data messages.

FIG. 11 illustrates some examples of learning neighbors from data messages. In the example, nodes 1, 2, and 3 are all in each other's radio range. Node 1 is doing neighbor discovery and nodes 2 and 3 are discovered by node 1.

Neighbors may be learned from broadcast data messages. In the example FIG. 11, node 3 sends a broadcast data message that is received by nodes 1 and 2. From this message node 1 may learn of the existence of node 3. Neighbors may also be learned from unicast data messages. In the example FIG. 11, node 3 sends a unicast data message to node 1. From this message node 1 may learn of the existence of node 3. Neighbors may also be learned from overheard data messages. In the example FIG. 11, node 2 sends a unicast data message to node 3. The same data message is also overheard by node 1. From this message node 1 may learn of the existence of node 2. For clarity, only the receiver operation related to neighbor discovery procedure of node 1 is illustrated in the figure. The receiver of the node doing neighbor discovery (node 1 in the example) may be on continuously or intermittently. Nodes 2 and 3 may also have their receivers on continuously or intermittently and nodes 2 and 3 may also be running the neighbor discovery procedure similarly as node 1.

As another example, to obtain ND, nodes may discover router node neighbors using passive scanning. The router nodes send periodical advertisement messages (sometimes called for example beacons or network beacons) which are scanned by a node doing neighbor discovery. The advertisement messages may be sent and received in one or multiple frequency channels. For each advertisement message a node receives from a router node neighbor, it may record to an internal list the sender of said message. The total router node amount in the neighborhood is the number of items in said list. In addition, also other parameters of the sender may be recorded.

Figure 12:
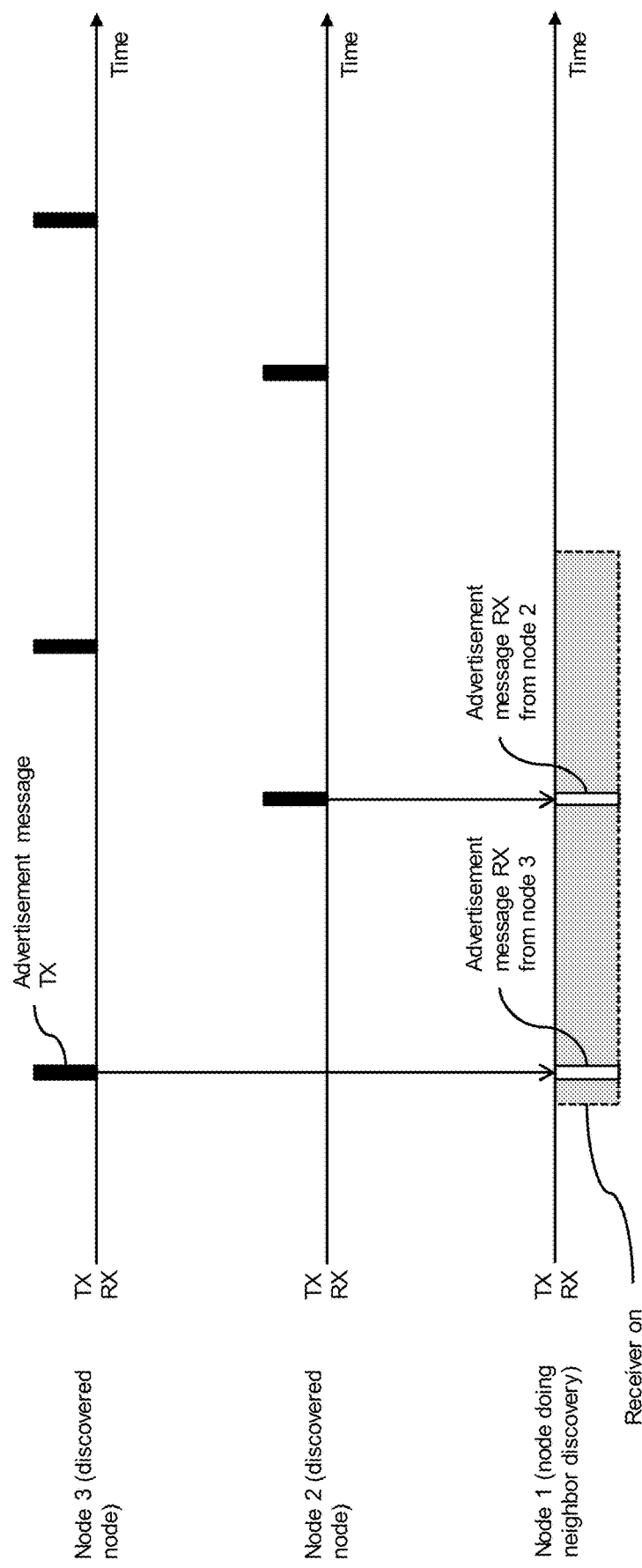
FIG. 12 illustrates schematically an example of neighbor discovery using passive scanning.

FIG. 12 illustrates an example of learning neighbors using passive scanning. In the example, nodes 1, 2, and 3 are all in each other's radio range. Node 1 is doing neighbor discovery and nodes 2 and 3 are discovered by node 1. Node 1 switches its receiver on to perform a (network) scan. During the scan, node 1 receives advertisements from node 2 and node 3. From these received advertisements, node 1 may learn of the existence of nodes 2 and 3. For clarity, only the receiver operation procedure of node 1 related to neighbor discovery is illustrated in the figure. The receiver of the node doing neighbor discovery (node 1 in the example) may be on continuously or intermittently. Nodes 2 and 3 may also have their receivers on continuously or intermittently and nodes 2 and 3 may also be running the neighbor discovery procedure similarly as node 1 and node 1 may send advertisements similarly as nodes 2 and 3.

As another example, to obtain ND, nodes may discover router node neighbors using active scanning. At the start of the neighbor discovery procedure, the node doing neighbor discovery sends an advertisement request message or messages (sometimes called for example beacon request). The router nodes that receive said advertisement request message respond by sending advertisement messages (sometimes called for example beacons or network beacons) and the node doing neighbor discovery scans these advertisements. The advertisement request and advertisement messages may be sent and received in one or multiple frequency channels. For each advertisement message a node receives from a router node neighbor, it may record to an internal list the sender of said message. The total router node amount in the neighborhood is the number of items in said list. In addition, also other parameters of the sender may be recorded.

Figure 13:
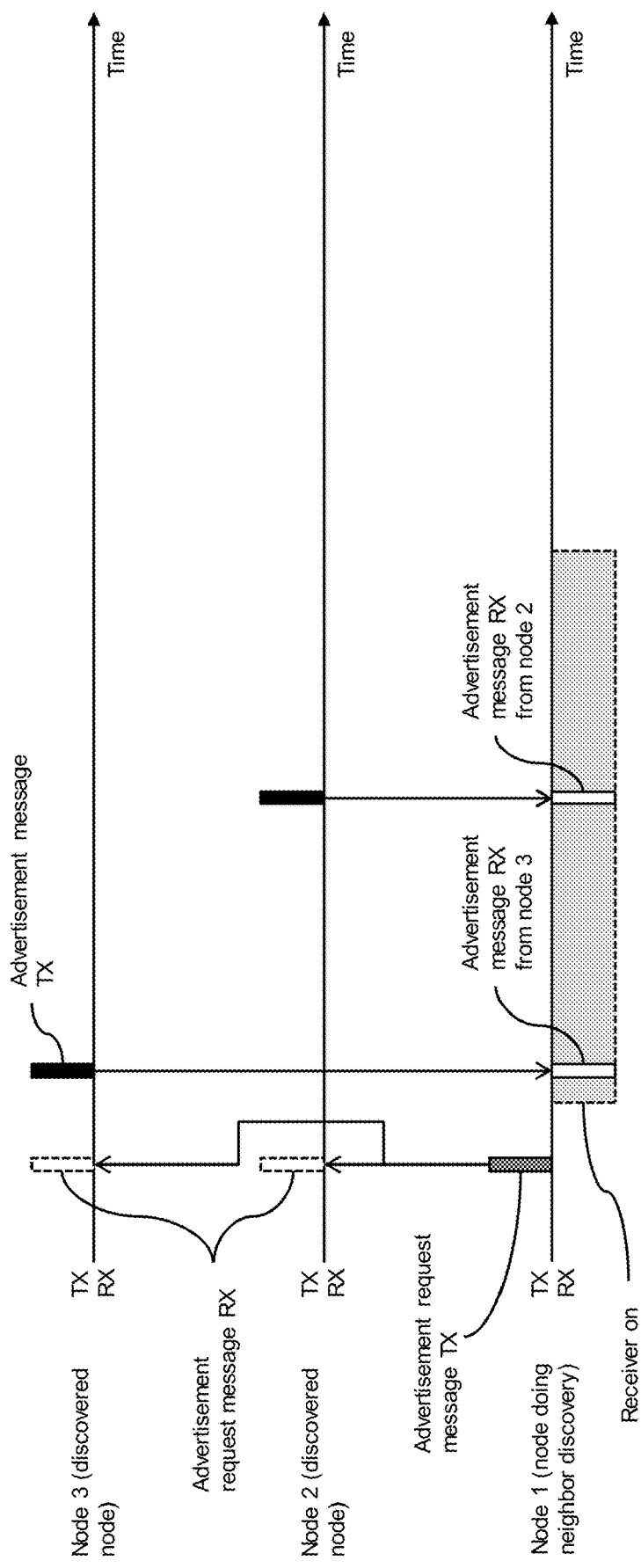
FIG. 13 illustrates schematically an example of neighbor discovery using active scanning.

FIG. 13 illustrates an example of learning neighbors using active scanning. In the example, nodes 1, 2, and 3 are all in each other's radio range. Node 1 is doing neighbor discovery and nodes 2 and 3 are discovered by node 1. First node 1 sends and advertisement request message. Nodes 2 and 3 receive the advertisement request message and respond with an advertisement message. After sending the advertisement request message, node 1 switches its receiver on to perform a (network) scan. During the scan, node 1 receives advertisements from node 2 and node 3. From these received advertisements, node 1 may learn of the existence of nodes 2 and 3. For clarity, only the receiver operation related to neighbor discovery procedure of node 1 is illustrated in the figure. The receiver of the node doing neighbor discovery (node 1 in the example) may be on continuously or intermittently. Nodes 2 and 3 may also have their receivers on continuously or intermittently and nodes 2 and 3 may also be running the neighbor discovery procedure similarly as node 1 and node 1 may send advertisements similarly as nodes 2 and 3.

As another example, to obtain ND, nodes may discover router node neighbors using a synchronous neighbor discovery protocol. The router nodes send periodical advertisement messages (sometimes called for example beacons or cluster beacons) which are received synchronously by neighboring nodes. These advertisement messages may contain information of the other router nodes known by the nodes sending the advertisement messages (information of neighbors' neighbors). The advertisement messages may be sent and received in one or multiple frequency channels. From each synchronous advertisement message a node receives from a router node neighbor, that includes information of other router nodes known by said router node, it may read information of other router nodes know by said router node that has sent the advertisements message. This information may be recorded to an internal list by the node receiving the advertisement messages. The total router node amount in the neighborhood is the number of items in said list. In addition, the node receiving said information may try to synchronize to other router nodes using the received information. In addition, also other parameters of the neighbors' neighbors may be sent and recorded.

Figure 14:
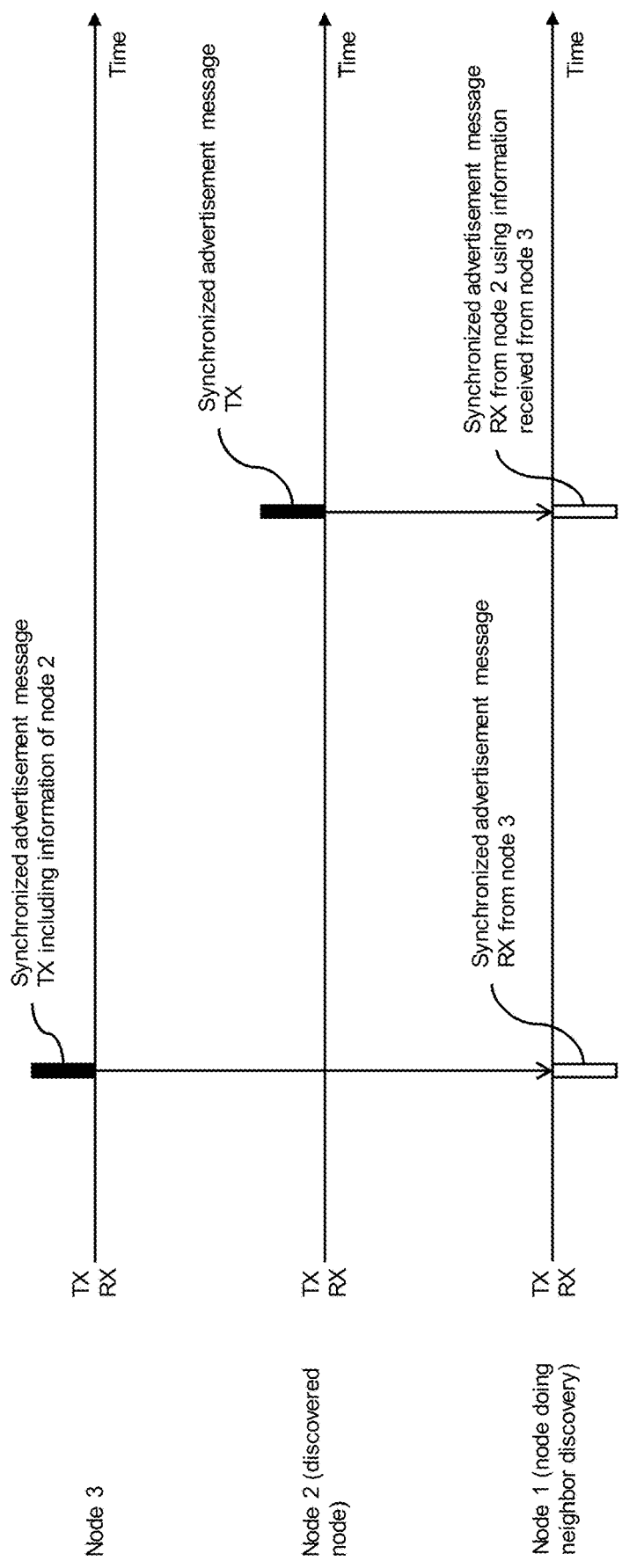
FIG. 14 illustrates schematically an example of neighbor discovery using a synchronous neighbor discovery protocol.

FIG. 14 illustrates an examples of learning neighbors using a synchronous neighbor discovery protocol. In the example, nodes 1, 2, and 3 are all in each other's radio range. Node 1 is doing neighbor discovery and node 2 is being discovered by node 1. Node 1 already knows of the existence of node 3 and is synchronized to node 3. Also, node 3 knows of the existence of node 2. Node 1 receives synchronously and advertisement message from node 3 which also includes information of node 2. By receiving the advertisement message, node 1 also learns of the existence of node 2. Additionally, node 1 also synchronizes to node 2. For clarity, only the receiver operation related to neighbor discovery procedure of node 1 is illustrated in the figure. The receiver of the node doing neighbor discovery (node 1 in the example) may be on continuously or intermittently. Nodes 2 and 3 may also have their receivers on continuously or intermittently and nodes 2 and 3 may also be running the neighbor discovery procedure similarly as node 1 and node 1 may send advertisements similarly as nodes 2 and 3.

Figure 15:
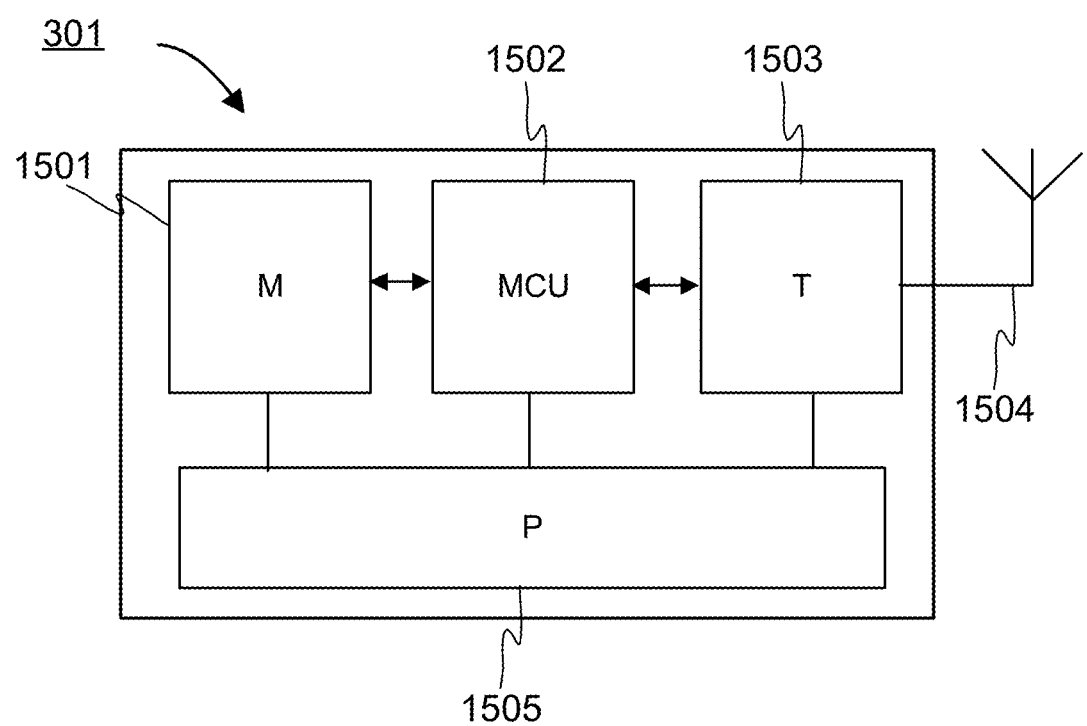
FIG. 15 illustrates schematically an example of a router node hardware architecture according to the invention.

FIG. 15 illustrates an example of a router node 301 hardware architecture according to the invention. The router node 301 comprises a memory 1501, a microcontroller unit (MCU) 1502, a radio transceiver 1503, antenna 1504, and a power supply 1505. The MCU 1502 is at least configured to implement at least some actions of the router node 301 as described. The implementation of the actions may be achieved arranging the MCU 1502 to execute at least some portion of computer program code stored in the memory 1501 causing the MCU 1502 to implement one or more actions of the router node 301 as described. The router node 301 uses radio transceiver 1503 in order to transmit and receive data between other router nodes via the antenna 1504. The power supply 1505 comprises components for powering the router node, e.g. a battery and a regulator.

The memory 1501 comprises the computer program, which is adapted to perform actions of the router nodes 301 presented in this detailed description part, when it is run in a computer, e.g. in the router node 301.

The computer program can be stored in a tangible non-volatile computer readable medium, e.g. an USB stick or a CD-ROM disc.

The above described invention provides efficient and low latency transmission method for a node to control one or more other nodes without prior knowledge of the target(s) and how to reach them. The method works both in sparse and dense networks and adapts to the density of the network.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A system for co-operative repetition of broadcast messages, the system comprising:
   a plurality of router nodes, each of the router nodes being configured to receive and repeat transmission of broadcast messages,
   wherein the plurality of router nodes is configured to collectively repeat a transmission of a broadcast message on one or more frequency channels a collective target amount of repetitions inside a neighborhood of the plurality of router nodes in order to keep the collective target amount of repetitions of the transmission of the broadcast message the same inside the neighborhood, independent of an amount of router nodes inside the neighborhood,
   wherein the amount of repetitions of individual router nodes differs from 0 to n, wherein n>0, in order to achieve the collective target amount of repetitions, and
   wherein each router node independently makes decisions to repeat the broadcast message.

2. The system according to claim 1, wherein each router node that receives the broadcast message is configured to:
   individually decide for each frequency channel of the one or more frequency channels whether to repeat the transmission of the received message, and
   in response to a decision to repeat the transmission of the received message on a frequency channel, the router node is further configured to:
      determine the amount of repetitions on said frequency channel, and
      repeat the transmission of the received message a determined amount of repetitions on said frequency channel.

3. The system according to claim 2, wherein the router node is configured to repeat the transmission of the received message after the decision to repeat the transmission and the determination of the amount of repetitions on said frequency channel.

4. The system according to claim 2, wherein the router node is configured to:
   add a frequency channel and the determined repetition amount to a list after the decision to repeat the transmission and the determination of the amount of repetitions on said frequency channel, and
   repeat the transmission of the received message on all the frequency channels added to the list after checking all the frequency channels.

5. The system according to claim 2, wherein the decision whether to repeat the transmission of the received message is based on a frequency channel-specific Transmit Decision Value (TDV).

6. The system according to claim 5, wherein the frequency channel-specific TDV is defined based on a targeted amount of collective repetitions per radio range and an amount of router nodes inside the radio range.

7. The system according to claim 6, wherein the frequency channel-specific TDV is further defined based on at least one of the following: a success rate of transmissions at said frequency channel, and a percentage of time the router nodes are in a receiving mode on average.

8. The system according to claim 1, wherein, before starting the repetitions, for part of the repetitions, or for each repetition of the transmission of the message, a random or constant delay is employed.

9. The system according to claim 1, wherein, before repetition of the transmission of the message, each router node is configured to sense the frequency channel by using a Clear Channel Assessment (CCA), when the sensing indicates that the frequency channel is free, the router node is configured to repeat the transmission of the broadcast message.

10. The system according to claim 9, wherein when the sensing indicates that the frequency channel is busy or remains busy for n attempts, the router node is configured to defer the repetition of the transmission of the broadcast message to a later time after which the router node is configured to attempt to repeat the transmission of the broadcast message again or the router node is configured to skip the repetition of the transmission of the broadcast message on that frequency channel.

11. The system according to claim 1, wherein, before repetition of the transmission of the message, each router node is configured to randomize the order of the frequency channels on which the transmission of the broadcast message is repeated in order to result in a frequency hopping schedule.

12. The system according to claim 1, wherein the one or more frequency channels are pre-configured or learned run-time by the router nodes.

13. A method for co-operative repetition of broadcast messages, the method comprising:
   repeating collectively, by a plurality of router nodes, a transmission of a broadcast message a collective target amount of repetitions inside a neighborhood of the plurality of router nodes on one or more frequency channels in order to keep the collective target amount of repetitions of the transmission of the broadcast message the same inside the neighborhood, independent of an amount of router nodes inside the neighborhood,
   wherein the amount of repetitions of individual router nodes differs from 0 to n, wherein n>0, in order to achieve the collective target amount of repetitions, and
   wherein each router node independently makes decisions to repeat the broadcast message.

14. The method according to claim 13, further comprising:
   deciding individually, by each router node that receives the broadcast message, for each frequency channel of the one or more frequency channels whether to repeat the transmission of the received message, and in response to a decision to repeat the transmission of the received message on a frequency channel, the method further comprising:
  determining, by the router node, the amount of repetitions on said frequency channel, and
  repeating, by the router node, the transmission of the received message determined amount of repetitions on said frequency channel.

15. The method according to claim 14, further comprising repeating, by the router node, the transmission of the received message after the decision to repeat the transmission and the determination of the amount of repetitions on the frequency channel.

16. The method according to claim 14, further comprising:
  adding, by the router node, a frequency channel and the determined repetition amount to a list after the decision to repeat the transmission and the determination of the amount of repetitions on said channel, and
  repeating, by the router node, the transmission of the received message on all the frequency channels added to the list after checking all the frequency channels.

17. The method according to claim 14, wherein the decision whether to repeat the transmission of the received message is based on a frequency channel-specific Transmit Decision Value (TDV).

18. The method according to claim 17, wherein the frequency channel-specific TDV is defined based on a targeted amount of collective repetitions per radio range and an amount of router nodes inside the radio range.

19. The method according to claim 18, wherein the frequency channel-specific TDV is further defined based on at least one of the following: a success rate of transmissions at said frequency channel, and a percentage of time the router nodes are in a receiving mode on average.

20. The method according to claim 13, wherein, before starting the repetitions, for part of the repetitions, or for each repetition of the transmission of the message a random or constant delay is employed.

21. The method according to claim 13, wherein, before repetition of the transmission of the message, by each router node, sensing the frequency channel by using a Clear Channel Assessment (CCA), when the sensing indicates that the frequency channel is free, by the router node, repeating the transmission of the broadcast message.

22. The method according to claim 21, wherein when the sensing indicates that the frequency channel is busy or remains busy for n attempts, by the router node, deferring the repetition of the transmission of the broadcast message to a later time after which attempting to repeat the transmission of the broadcast message again or skipping, by the router node, the repetition of the transmission of the broadcast message on that frequency channel.

23. The method according to claim 13, wherein, before repetition of the transmission of the message, by each router node, randomizing the order of the frequency channels on which the transmission of the broadcast message is repeated in order to result in a frequency hopping schedule.

24. The method according to claim 13, wherein the one or more frequency channels are pre-configured or learned run-time by the router nodes.

25. A router node for co-operative repetition of broadcast messages, the router node comprising:
  a microcontroller unit; and
  a memory storing at least one portion of computer program,
  wherein the microcontroller unit is configured to cause the router node at least to:
    receive and repeat transmission of broadcast messages, and
    collectively, as a part of a plurality of router nodes, repeat a transmission of a broadcast message on one or more frequency channels a collective target amount of repetitions inside a neighborhood of the plurality of router nodes in order to keep the collective target amount of repetitions of the transmission of the broadcast message the same inside the neighborhood, independent of an amount of router nodes inside the neighborhood,
  wherein the amount of repetitions of the router node differs from 0 to n, wherein n>0, in order to achieve the collective target amount of repetitions, and
  wherein each router node independently makes decisions to repeat the broadcast message.

26. The router node according to claim 25, wherein, after receiving the broadcast message, the router node is configured to:
  individually decide for each frequency channel of the one or more frequency channels whether to repeat the transmission of the received message, and
  in response to a decision to repeat the transmission of the received message on a frequency channel, the router node is further configured to:
    determine the amount of repetitions on said frequency channel, and
    repeat the transmission of the received message determined amount of repetitions on said frequency channel.

27. The router node according to claim 26, wherein the router node is configured to repeat the transmission of the received message after the decision to repeat the transmission and the determination of the amount of repetitions on said frequency channel.

28. The router node according to claim 26, wherein the router node is configured to:
  add a frequency channel and the determined repetition amount to a list after the decision to repeat the transmission and the determination of the amount of repetitions on said channel, and
  repeat the transmission of the received message on all the frequency channels added to the list after checking all the frequency channels.

29. The router node according to claim 26, wherein the decision whether to repeat the transmission of the received message is based on a frequency channel-specific Transmit Decision Value (TDV).

30. The router node according to claim 29, wherein the frequency channel-specific TDV is defined based on a targeted amount of collective repetitions per radio range and an amount of router nodes inside the radio range.

31. The router node according to claim 30, wherein the frequency channel-specific TDV is further defined based on at least one of the following: a success rate of transmissions at said frequency channel, and a percentage of time the router nodes are in a receiving mode on average.

32. The router node according to claim 25, wherein, before starting the repetitions, for part of the repetitions, or for each repetition of the transmission of the message, a random or constant delay is employed.

33. The router node according to claim 25, wherein, before repetition of the transmission of the message, the router node is configured to sense the frequency channel by using a Clear Channel Assessment (CCA), when the sensing indicates that the frequency channel is free, the router node is configured to repeat the transmission of the broadcast message.

34. The router node according to claim 33, wherein, when the sensing indicates that the frequency channel is busy or remains busy for n attempts, the router node is configured to defer the repetition of the transmission of the broadcast message to a later time after which the router node is configured to attempt to repeat the transmission of the broadcast message again or the router node is configured to skip the repetition of the transmission of the broadcast message on that frequency channel.

35. The router node according to claim 25, wherein, before repetition of the transmission of the message, the router node is configured to randomize the order of the frequency channels on which the transmission of the broadcast message is repeated in order to result in a frequency hopping schedule.

36. The router node according to claim 25, wherein the one or more frequency channels are pre-configured or learned run-time by the router nodes.

37. A method for co-operative repetition of broadcast messages for a router node, the method comprising:
   receiving and repeating transmission of broadcast messages; and
   collectively as a part of a plurality of router nodes repeating a transmission of a broadcast message on one or more frequency channels a collective target amount of repetitions inside a neighborhood of the plurality of router nodes in order to keep the collective target amount of repetitions of the transmission of the broadcast message the same inside the neighborhood, independent of an amount of router nodes inside the neighborhood,
   wherein the amount of repetitions of the router node differs from 0 to n, wherein n>0, in order to achieve the collective target amount of repetitions, and
   wherein each router node independently makes decisions to repeat the broadcast message.

38. The method according to claim 37, further comprising:
   deciding individually, by the router node that receives the broadcast message, for each frequency channel of the one or more frequency channels whether to repeat the transmission of the received message, and
   in response to decision to repeat the transmission of the received message on a frequency channel, the method further comprising:
      determining, by the router node, the amount of repetitions on said frequency channel, and
      repeating, by the router node, the transmission of the received message determined amount of repetitions on said frequency channel.

39. The method according to claim 38, further comprising:
   repeating, by the router node, the transmission of the received message, after the decision to repeat the transmission and the determination of the amount of repetitions on said frequency channel.

40. The method according to claim 38, further comprising:
   adding, by the router node, a frequency channel and the determined repetition amount to a list after the decision to repeat the transmission and the determination of the amount of repetitions on said channel, and
   repeating, by the router node, the transmission of the received message on all the frequency channels added to the list after checking all the frequency channels.

41. The method according to claim 38, wherein the decision whether to repeat the transmission of the received message is based on a frequency channel-specific Transmit Decision Value (TDV).

42. The method according to claim 41, wherein the frequency channel-specific TDV is defined based on a targeted amount of collective repetitions per radio range and an amount of router nodes inside the radio range.

43. The method according to claim 42, wherein the frequency channel-specific TDV is further defined based on at least one of the following: a success rate of transmissions at said frequency channel, and a percentage of time the router nodes are in a receiving mode on average.

44. The method according to claim 37, wherein, before starting the repetitions, for part of the repetitions, or for each repetition of the transmission of the message, a random or constant delay is employed.

45. The method according to claim 37, wherein, before repetition of the transmission of the message, by the router node, sensing the frequency channel by using a Clear Channel Assessment (CCA), when the sensing indicates that the frequency channel is free, by the router node, repeating the transmission of the broadcast message.

46. The method according to claim 45, wherein when the sensing indicates that the frequency channel is busy or remains busy for n attempts by the router node, deferring the repetition of the transmission of the broadcast message to a later time after which attempting to repeat the transmission of the broadcast message again or skipping, by the router node, the repetition of the transmission of the broadcast message on the frequency channel.

47. The method according to claim 37, wherein, before repetition of the transmission of the message, by the router node, randomizing the order of the frequency channels on which the transmission of the broadcast message is repeated in order to result in a frequency hopping schedule.

48. The method according to claim 37, wherein the one or more frequency channels are pre-configured or learned run-time by the router nodes.

49. A non-transitory non-volatile computer readable medium on which is stored a computer program, which when executed by a computer, causes the computer to perform the method of claim 37.

* * * * *